(12) United States Patent
Watson et al.

(10) Patent No.: US 7,189,312 B2
(45) Date of Patent: Mar. 13, 2007

(54) UNDER WATER CABLE SYSTEM HAVING AN EARTHING ELECTRODE

(75) Inventors: Ian Gerard Watson, Harlow (GB); Philip Andrew Norman, Herfordshire (GB); David Lancelot Walters, Hertfordshire (GB); Peter Worthington, Southampton (GB)

(73) Assignee: Alcatel, Paris (FR)

( * ) Notice: Subject to any disclaimer, the term of this patent is extended or adjusted under 35 U.S.C. 154(b) by 746 days.

(21) Appl. No.: 10/282,175

(22) Filed: Oct. 29, 2002

(65) Prior Publication Data
US 2003/0102212 A1    Jun. 5, 2003

(30) Foreign Application Priority Data
Oct. 31, 2001   (GB)   ................................. 0126167.6

(51) Int. Cl.
*C23F 13/06*   (2006.01)

(52) U.S. Cl. .................... 204/196.36; 204/196.17; 204/196.18; 204/196.19; 204/196.2; 204/196.21; 204/196.3; 204/196.33; 204/196.34; 204/196.35; 204/196.37; 324/71.1; 324/71.2; 174/6; 174/5 SG; 385/100; 385/101; 385/102; 385/106; 385/107

(58) Field of Classification Search ........... 204/196.17, 204/196.18, 196.19, 196.2, 196.3, 196.33, 204/196.34, 196.35, 196.36, 196.21, 196.37; 324/71.1, 71.2; 174/6, 5 SG; 385/100, 101, 385/102, 106, 107
See application file for complete search history.

(56) References Cited

U.S. PATENT DOCUMENTS

| 3,435,124 A | 3/1969 | Channell |
| 4,660,909 A | 4/1987 | Wilson |
| 4,885,428 A | 12/1989 | Roberts |
| 6,288,972 B1 * | 9/2001 | Norris .......................... 367/16 |
| 6,809,506 B2 * | 10/2004 | Thomas et al. ............ 324/71.1 |

FOREIGN PATENT DOCUMENTS

| EP | 0065113 A1 | 11/1982 |
| WO | WO 9500984 | 1/1995 |

* cited by examiner

*Primary Examiner*—Bruce F. Bell
(74) *Attorney, Agent, or Firm*—Sughrue Mion, PLLC

(57) ABSTRACT

An earthing electrode assembly and method for providing a submerged electrical apparatus with an earth path, the electrode assembly having an earthing electrode, an attachment device for attaching the electrode assembly to a cable, and an insulated electrical connection for connecting the earthing electrode to the submerged electrical apparatus. The connection is formed to be of sufficient length for the submerged electrical apparatus to be protected from electrochemical effects resulting from operation of the earthing electrode.

18 Claims, 2 Drawing Sheets

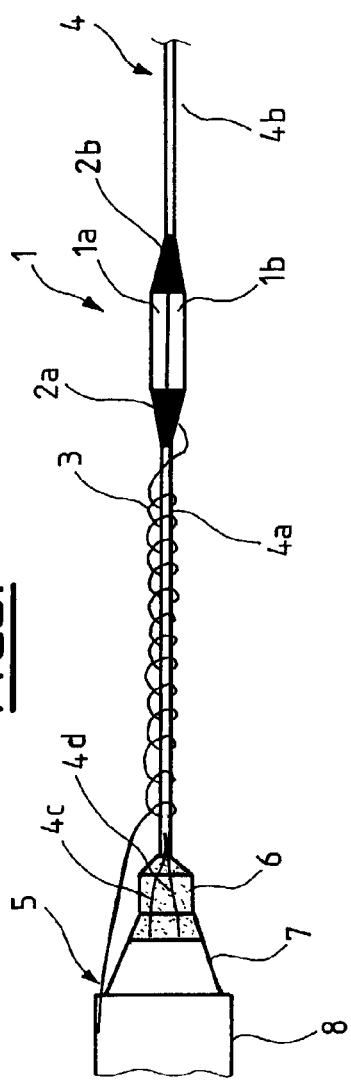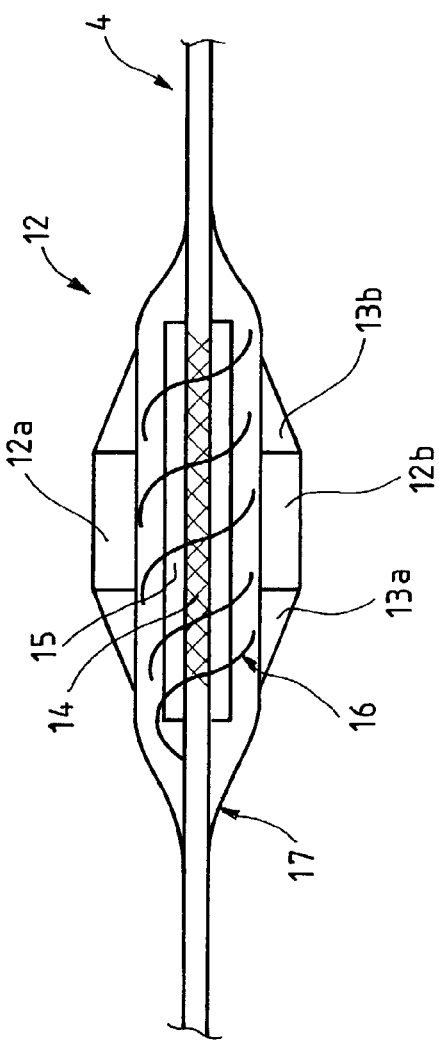

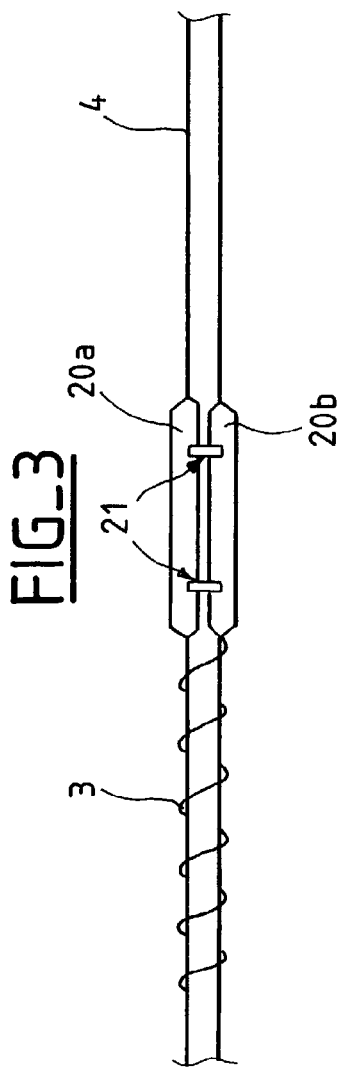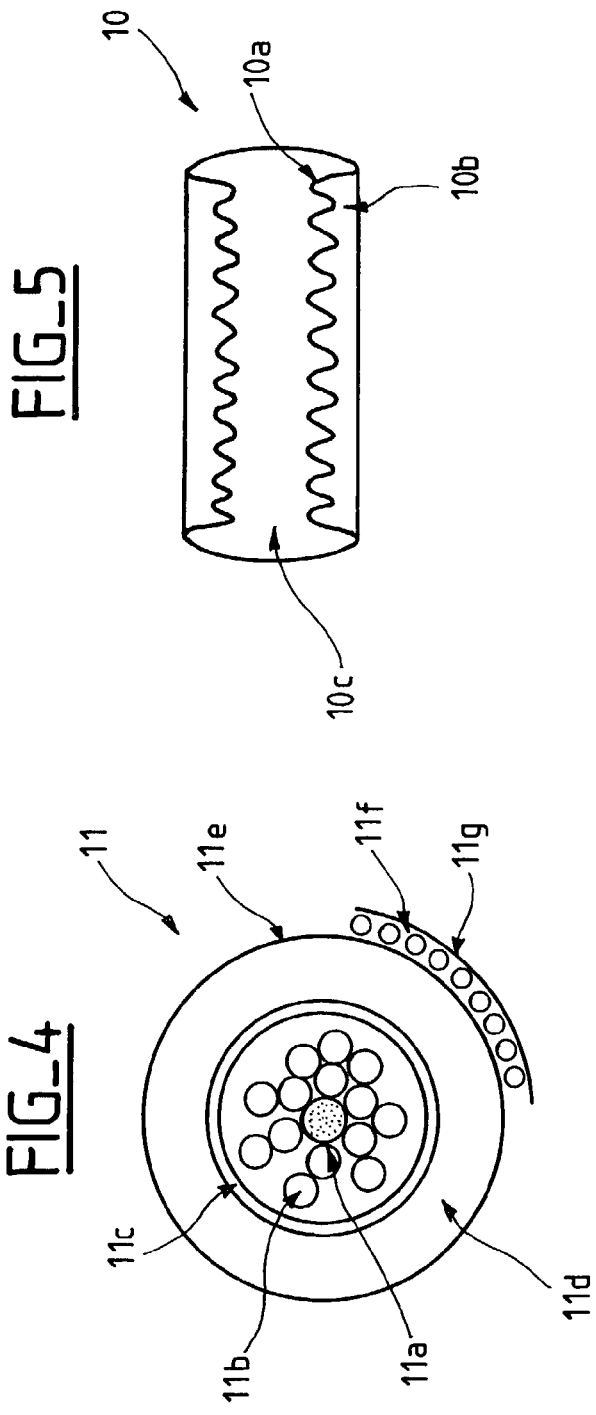

UNDER WATER CABLE SYSTEM HAVING AN EARTHING ELECTRODE

BACKGROUND OF THE INVENTION

The present invention relates to the field of submerged apparatus, in particular submerged cable systems as used for example in under sea communications involving the transfer of data through fibre optic cables located at the bottom of the sea. The cables referred to normally lie either on the sea bed, as is typically the case for deep water installations or they may be buried, beneath the sea bed, either by a natural process or by deliberate action, which may be a method typically employed in shallow water installations. For example, when a cable passes from deep water to a land base, as the shore is approached the cables may be buried beneath the sea bed and continue to be buried under ground when on land to protect them from mechanical damage, interference and such like. The invention not only applies to undersea applications, involving for example fibre optic carrying cables, but also applies to any underwater cable installation where an earth is required, including installations in lakes and such like.

The cables used, for example, in such underwater applications and which involve the carrying of optical fibres, generally require increased mechanical protection against damage in shallow water as compared to deep water, due to the higher likelihood of mechanical damage in shallower waters. Mechanical protection in the first instance typically involves the use of an insulated polyethylene sheath casing around a core where the various fibres power conductors are situated. However this may be supplemented by one or more layers of steel armouring wires, which is itself protected from the environment, for example from sea water, by an outer sheath or layer of tar or such like.

One of the major environmental hazards for this kind of cable is the presence of molecular hydrogen in the vicinity of the cable, which may for example be the result of local electrolysis of the sea water, such as that created by the close proximity of an earthing electrode, when operated as a cathode, through which electrical current is flowing to earth via the sea. This problem is exacerbated in situations where the molecular hydrogen is able to accumulate due to a lack of water movement, for example when a cable is buried beneath the sea or when a cable has become covered in silt or similar deposits.

One of the protective measures employed in submerged cables which carry in their core optical fibres and power conductors, is the use of a metallic layer, typically copper and which is located between the core of the cable and the polyethylene sheath. This metallic layer, which surrounds optical fibres in the core of the cable, serves the function, amongst other things, of providing a hydrogen barrier. Provided the metallic layer remains intact, it will prevent hydrogen from penetrating to the core of the cable, where it could damage optical fibres typically noticeable in the form of increasing optical losses.

In the field of submerged fibre optic cable communications, there is a requirement, owing to the long distances involved, to interrupt the cables at regular intervals in order to provide e.g. repeater units, equalisation units, as well as junctions where fibre optic paths are split, combined, rings completed and such like. These latter devices are generally referred to as branching units (BU's) and by the nature of the way in which they function, will often require an earth, for example to discharge into the water the DC powering current from one cable where three cables are joined together. For example, at a submerged branching unit where three cables meet, a line current of 1–2 amps from one of the three legs of the junction would typically need to flow to earth via the sea. This produces major local electrochemical effects in terms of hydrogen generation and/or metal corrosion from which the system needs to be protected.

One solution currently employed for providing an earth at a branching unit, is to insulate the system earth from the main housing of the branching unit and to connect it directly to a separate electrode, typically made of copper or steel which is placed in the water, either on or in the vicinity of the branching unit.

Such an arrangement has drawbacks, however, since, if the earth is operated as a cathode, it will be an intense source of molecular hydrogen. Therefore it cannot be placed less than about 2 metres from any non-hermetic part of the cable, including cable joint housings or copper weld skips. As regards the effects of such an intense source of molecular hydrogen on any fibre optic carrying cable in the vicinity, then any hydrogen path between such a source, which is in effect a region where hydrogen has a high partial pressure, and the core of the cable, where power and fibre optic cables are located, can result, albeit after several years of progressive penetration, in the failure of the fibre optic cables. This is typically noticeable in the form of progressively increasing optical losses.

However, it has been found that even the presence of a metallic layer in the cable, serving as a hydrogen barrier, cannot be totally relied on when the cable is in close proximity to an intense source of molecular hydrogen. The reason is that any defect in the copper layer, (which could typically arise as a result of bending the cable and other stresses arising from moving the cable, laying the cable, but also when cables are lifted to carry out repairs, such as may be required to gain access to a branching unit in order to repair a cable or repeater or other device which has been damaged or become defective) may allow hydrogen to penetrate. This drawback applies likewise when an earthing electrode, operated as a cathode, is located in close proximity to a branching unit housing, its associated bend limiting devices (otherwise referred to as an 'armadillo') and extremity termination boxes, since the seals of these may not effectively protect the components inside, including fibre optic cables within the housing, from the effects of penetration of molecular hydrogen with the passage of time. This means in practice that such an earth cannot be placed within less than about 2 metres from any non-hermetic part of the system.

If the electrode is in close proximity to any metal, then another drawback occurs, namely that both the electrode itself as well as any metalwork in the vicinity of the electrode, may be subject to very high levels of corrosion. Typically, any metallic parts within less than about 1 metre from an electrode operated as a cathode in an undersea application, may be subject to generally unacceptably high levels of corrosion due to earth currents flowing preferentially into them. In addition it is not possible to operate such an electrode as an anode because of metal erosion from the electrode itself.

A further drawback of this solution is that the electrode, which is installed on or near the cable housing, can give rise to handling problems in the cable factory and in marine situations, such as maneuvering the cable off a drum, cable laying and such.

To overcome some of the above mentioned problems, an alternative approach has sometimes been adopted. In this approach, the earth connection is made directly to the metallic BU housing and this housing is in turn electrically connected to the steel armouring wires on one or more of the three cable 'legs'. With this method, all metallic parts are at the same potential so that no corrosion occurs due to earth-return currents. The BU housing is coated with an insulating material, whereas the armouring wires are in close contact with the sea, so that the BU earth current flows to sea through the armouring wires, with no build-up of hydrogen near any critical parts. This system works very well in shallow water, where the armouring wires are many kilometres long so that the hydrogen produced is distributed over a large area and so there is no build-up sufficient to have any significant effect on critical areas. In deep water, however, where the cable is not armoured, special lengths (~50 m) of armouring need to be applied to the cable specifically for this purpose. In this situation, the armour wires need to be terminated at least 2 m from the BU and jointing boxes to avoid the hydrogen build-up problems mentioned earlier. Such an earth design should operate indefinitely when used as a cathode, and can be used as an anode for a time of the order of one year before corrosion of the armouring wires or other metallic parts becomes unacceptable.

If this latter design philosophy for BU earthing is adopted, hydrogen and corrosion problems are avoided, but there are a number of disadvantages, notably: the mechanical discontinuity in flexural stiffness of the cable near the BU gives major handling problems in factories and on board ships during installation or recovery, deep-water and shallow-water designs are different so that common spares are not possible, and the factory assembly process is a long and non-standard operation. To overcome these difficulties, a new approach is proposed.

SUMMARY OF THE INVENTION

The aim of the invention is preferably to provide a simple and robust earth electrode assembly usable with different types and sizes of cable as well as in both shallow and deep water applications, which is suitable for providing an earth for a submerged electrical apparatus, e.g. installed in a fibre optic cable communication system such as a branching unit, with an earth, and which can easily be handled in marine situations, such as cable laying. A further aim of the invention is preferably to provide an electrode assembly which consistently keeps the electrode in the same position relative to the submerged electrical apparatus after installation of the cable. A yet further aim of the invention is preferably to provide an electrode assembly which is capable of operating as either a cathode or as an anode without damaging the system it is earthing, due to the effects of molecular hydrogen and/or corrosion.

According to a first aspect of the invention there is an earthing electrode assembly for providing a submerged electrical apparatus with an earth path, whereby the electrode assembly is provided with an earthing electrode and attachment means so that the electrode assembly is capable of attachment to a cable, while at the same time being electrically insulated from this cable, and the electrode assembly is provided with an insulated electrical connection for connecting it to the submerged electrical apparatus, said connection being of sufficient length to enable the electrode to be located at a distance from the apparatus which is sufficient for the apparatus to be substantially protected from the electrochemical effects resulting from the operation of the electrode.

According to a second aspect of the invention, a cable system is envisaged which includes a cable connected to an electrical device to be earthed, the cable system including an earthing electrode, attachment means attaching the electrode to the cable and an insulated electrical connection between the electrode and the electrical apparatus to be earthed, the electrode being located at a distance from the apparatus which is sufficient for the apparatus to be substantially protected from the electrochemical effects resulting from the operation of the electrode.

According to a third aspect of the invention, a method of installation of an earth electrode on a cable is envisaged, including the steps of: (1) one or more outer layers of the cable, which include cable outer sheath and/or armouring wires, are temporarily cut and displaced so as to expose an inner layer (2) a hydrogen barrier layer is then applied to said exposed inner layer (3) an outer layer is then replaced around the hydrogen barrier layer and sealed by the application of a further electrically insulating cable sheath, and the earth electrode is then attached to the outside of the insulated cable.

According to a fourth aspect of the invention, an earthing electrode suitable for providing a submerged earth, whereby the electrode includes a titanium core which is coated with platinum or a mixed metal oxide of tantalum and iridium.

The following description applies to any or all aspects of the invention.

In order to facilitate easier installation of the electrode on the cable, the attachment means may be arranged so as to attach the electrode releasably to the outside of a cable, using any mechanical attachment means, e.g. a clamping arrangement and such like.

According to one advantageous embodiment of the invention the electrode is made up of two parts or members, which may for example be of substantially the same size and shape, and which together provide the attachment means and which grip the outer surface of the cable. It is nevertheless entirely feasible to achieve the aims of the invention with three or more such members which together grip the outer surface of the cable. It may also be that the electrode comprises two members which together provide the attachment means and which essentially sandwich the cable by the use of means which urge the two parts of the electrode towards each other, for example by the use of bolts on one member which pass through poles in the other member, on the back of which nuts are located, which when tightened, urge the two members towards each other.

According to one advantageous embodiment of the invention, the two or more members of the electrode are intended to abut one another, to form a substantially cylindrical outer shape, yet at the same time provide a central aperture in which the cable, on which the electrode is being installed, can be located. To this end, each of the members may be provided with corresponding abutment surfaces, which may for example be flat, one or more of which may furthermore be substantially in the same plane as the axis of the cylindrical outer shape. It may also be that the inside surfaces of this aperture provide the attachment means by gripping the outer surface of the cable.

The purpose of the attachment means and therefore this gripping action as well as the gripping action of the electrode of embodiments described earlier, is that the electrode is held in place such that it cannot slide along the cable, for example when being maneuvered into position from off the back of a ship.

According to a preferred embodiment of the invention the electrode may include a titanium core which is coated with a mixed metal oxide of tantalum and iridium. It has been found that this combination of materials results in an electrode which is particularly resistant to electrolytic corrosion, which is a particular problem when the electrode is operated as an anode. It has furthermore been found that when an electrode made of these materials is damaged in such a way as to break the coating and expose the titanium core, then during further operation of the electrode, the exposed titanium oxidises giving rise to a further protective coating of titanium oxide over the damaged area. In this way, even when the outer coating of the electrode is damaged, the electrode will in effect repair itself and a good life expectancy for the electrode would still be achievable.

According to a further particular embodiment of the invention, a good life expectancy of the electrode can also be achieved by the use of a platinum coating on the outside of the electrode.

As a further embodiment of the cable system of the invention it is envisaged that the earthing electrode is permanently attached to the cable, the electrode or elements of the electrode having been embedded in one or more layers of the cable, in particular of the outer casing of the cable. According to one version of this embodiment the electrode may not protrude above the level of the outer surface of the surrounding cable any more than would the casing of a cable-to-cable joint.

According to one version of the invention, the potential problems posed by the close proximity of an earth electrode, in terms of hydrogen generation, are addressed by the use of an additional hydrogen barrier layer in the form of a generally coaxial metallic layer which passes between the earthing electrode and the centre of the cable and which extends a predetermined distance on either side of the position of the electrode.

According to one particular embodiment of the invention the additional hydrogen barrier layer can be realized by the use of metallic or metalised tapes which may include a suitable backing material made of plastic, neoprene or such like, however this is not essential. Similarly the additional hydrogen barrier layer may take the form of a metalised heat shrink layer which is subjected to heating in order for it to shrink onto and thereby seal one or more inner layers of the cable during a heat application process.

According to one preferred embodiment of the invention the insulated electrical connection, between the electrode and the apparatus to be earthed, is in the form of a separate insulated lead which runs alongside the cable.

However the use of an insulated lead is not essential and any suitable insulated conductor between the electrode and the apparatus to be earthed is envisaged.

BRIEF DESCRIPTION OF THE DRAWINGS

The invention will now be described by means of non-limiting embodiments, with reference to the following drawings:—

FIG. 1 illustrates an earthing electrode assembly and a cable system including an earthing electrode assembly in accordance with an embodiment of the present invention.

FIG. 2 illustrates an earthing electrode installed on a cable provided with a hydrogen barrier layer in accordance with an embodiment of the present invention.

FIG. 3 illustrates an alternative embodiment of the earthing electrode attached to a cable in accordance with the present invention.

FIG. 4 illustrates a typical prior art submerged communications cable to which the present invention can be applied.

FIG. 5 illustrates one type of heat shrink sleeve which may be used in accordance with one aspect of the present invention.

DETAILED DESCRIPTION OF THE INVENTION

FIG. 1 illustrates an earthing electrode (1) in accordance with the present invention, the electrode being attached to a cable (4) which carries in its core the power conductor and optical fibres The cable (4) is connected to a branching unit or 'BU' (8) after first of all passing through an extremity termination box (6), followed by a bend limiter (7), otherwise known as an 'armadillo' which is attached to the housing of the branching unit (8). These items of equipment are intended for underwater operation, in particular undersea operation which may involve very great depths and therefore extreme pressure conditions and recovery loads.

The branching unit (8) consists of a housing which can accommodate electrical, optical and electronic equipment such as power configuration relays, amplifiers, supervisory circuits and passive optics, a tilt equalisation unit, a splitter, a coupler where for example three or more cables meet and such like. The electrical equipment in the branching unit takes power from one or more of the power cables carried by the cables it is connected to. The equipment housed in the branching unit normally requires an earth, especially where three or more powered cables meet, whereby typically a line current of 1–2 amps from one of the three legs will need to flow to earth via the sea.

According to this embodiment of the invention, the equipment earth in the branching unit is connected to an insulated electrical lead which passes directly out of the branching unit housing through a sealed opening (5) between the interior of the branching unit housing and the sea, without making electrical contact with the housing. This insulated electrical connection in the form of an insulated conducting lead (3) then passes alongside the cable (4a) until the point at which it connects to the earthing electrode (1).

According to this embodiment of the invention, the earthing electrode generally consists of two mating halves having, when abutted together, a cylindrical outer shape, whereby one of the halves is connected to the insulated connection lead (3) and is electrically connected to the other half by virtue of the contact of the two halves due to their abutting relationship when in the final installed position. The abutment surfaces of the two halves are substantially flat and in the same plane as the axis of the cylindrical outer shape. When the two halves (1a, 1b) abut one another, then a passage or aperture of sufficient dimension to accommodate the cable with which the electrode is intended to be used, is created. When the two halves (1a, 1b) are clamped together, by any one of a number of conventional means, they will grip the outside of the cable (4) with sufficient force to lock the electrode in position so that it does not slide along the cable, when the cable is being manipulated, for example unwound off a drum or laid in the sea.

As illustrated in FIG. 1, bend limiters (2a, 2b) are provided on either side of the earthing electrode. The purpose of these is to reduce stresses in the cable which might otherwise be caused by the attachment of the rigid electrode, in a similar manner to the use of bend limiters (7) in relation to the cable attachment of a branching unit (8). These bend limiters may furthermore be attached in such a way as to serve the function of locking the earthing electrode in its position so that it does not slide along the cable when the cable is manipulated. In this way, the earthing electrode does not need to be designed to fit the cable exactly and may therefore include a generous central aperture through which the cable passes, which in turn makes it possible to have one electrode size for a plurality of different cable sizes.

The earthing electrode, in particular the two halves of the earthing electrode preferably include a titanium core which is coated with a mixed metal oxide of tantalum and iridium, however a titanium core which is coated with a platinum layer is also envisaged. It has been found that the choice of these particular materials gives the electrode very good endurance properties, however the earthing electrode of the earthing electrode and cable assembly of the invention can be made from any suitable electrode material, including copper or steel.

In order to achieve the aims of the invention, the earthing electrode is preferably located on the cable at a suitable distance from the branching unit, so that molecular hydrogen generated from the electrode when it is operated as a cathode, does not penetrate the branching unit (8) or its associated equipment (6, 7) or is substantially prevented from doing so. Additionally, it needs to be separated from the branching unit (8) and its associated equipment, by a certain distance due to the corrosive effects on any metal work in the vicinity of stray currents emanating from an electrode when being operated as an anode or cathode.

It has been found that a distance between electrode and any other equipment, of the type mentioned, of at least 5 metres achieves the aims of the invention in that the equipment which is being provided with an earth path can be expected to have a normal life expectancy, of at least 25 years. However the invention is not limited to a minimum distance of 5 metres and a shorter distance may be acceptable where small currents need to be earthed, sea conditions permit or a shorter life expectancy can be tolerated. Similarly a shorter distance may be acceptable in other circumstances, for example if the cable is installed in a fresh water lake. The distance between the electrode and the apparatus to be earthed and therefore the length of the insulated conducting lead (3) will therefore be determined by routine field trials or by calculation and depend on factors such as the shape and size of the electrode, the earthing current, the water properties, the location of the cable, in particular whether it is to be buried beneath the sea bed or not, the type of cable being attached to and the system life expectancy being aimed for. The use of the expression "for the apparatus to be protected" in the context of this invention is not therefore an expression of absolute protection, but rather an acceptable degree of protection to achieve the desired system life expectancy.

As can be seen from FIG. 1, the earthing electrode, when it is attached to the cable, does not occupy any more space in terms of an increase in the cross sectional area of the cable or an increase in the length of a rigid portion of the cable, than would a normal cable-to-cable joint. This is due primarily to the preferred arrangement in which the electrode surface area is provided by an elongate electrode shape which is aligned with the cable. This preferred embodiment results in particular advantages when it comes to handling the cable and earthing electrode combination, which is especially important in view of the need to handle the cable in confined spaces on a marine vessel when the cable is being laid into the sea.

The earthing electrode is illustrated in FIG. 1. Nevertheless it is also envisaged that an earthing electrode can be attached to or surround more than one cable, especially where the cables are side by side due to their close proximity to a branching unit into which they are both going to connect. Indeed in such a situation, the attachment of an earthing electrode to one cable of such a pair of cables might risk damaging the casing of the other cable when the cable assembly is being manipulated or laid into the sea.

FIG. 2 illustrates one possible way of providing an additional hydrogen barrier layer in the cable for the part of the cable which is in close proximity to the earthing electrode. Nevertheless it should be pointed out that the hydrogen barrier layer may, depending on the position of the electrode, extend all the way from the electrode into the connections of the branching unit whose equipment is being provided with an earth.

The provision of a hydrogen barrier a certain distance on either side of the earthing electrode may however provide a satisfactory solution in many instances, and this is what is illustrated in FIG. 2. The hydrogen barrier may be applied to any type of submerged cable carrying fibre optic communications cables and/or power cables, a typical example of which is illustrated in FIG. 4.

FIG. 4 illustrates a cable which carries optical fibres (11*a*) and electrical power (11*b*) in its central core, where the cables are typically set in polyethylene or other suitable material to form a round cross section. A copper layer (11*c*) is then typically provided around this core, which serves to protect the cables being carried from penetration by any gas or fluid. This copper layer is then surrounded by a polyethylene casing (11*d*) which serves to provide electrical insulation and mechanical protection for the fibres being carried, and this on its own would normally suffice as the only mechanical protection required in deep water applications.

Additional mechanical protection is normally required for installations in shallower waters and is typically provided by one or more layers of steel wire armouring (11*f*), as is commonly known in the field of cables, which is itself normally encased and protected from the environment in which it operates by an outer layer (11*g*) which can for example consist of a tar layer or other suitable material.

According to the embodiment of the invention illustrated in FIG. 2, the outer casing as well as the layer of steel wire armouring has been temporarily removed to enable a hydrogen barrier layer to be inserted along a predetermined section of cable. According to this embodiment, the hydrogen barrier layer takes the form of metallic or metalised tapes (14) which are applied to the outside of the polyethylene casing (11*d*) in order to seal this section of the cable from hydrogen penetration.

The tapes are encapsulated by a layer of synthetic material or resin (15) to ensure that the position of the tapes does not change when the cable is manipulated or laid into the sea, or during the lifetime of the installation. According to this embodiment, the steel armouring wires (16) removed to enable the hydrogen barrier layer to be installed are wrapped around the layer which encapsulates the braided metallic or metalised tapes (14).

According to this embodiment of the invention, an additional protective layer (17) is provided which seals the region of the cable in which an additional hydrogen barrier layer has been installed, from the environment, in order that the integrity of the outside of the cable remains unaffected by the installation of the hydrogen barrier layer. FIG. 2 also shows schematically one typical position for an earthing electrode (12*a*, 12*b*) relative to the cable, and in particular to the hydrogen barrier layer applied to the cable. This figure also illustrates bend limiters (13*a*, 13*b*) which are attached to the cable, modified to include an additional hydrogen barrier layer, on either side of the earthing electrode.

It has been found that a length of typically 3 to 5 metres for the additional hydrogen barrier layer, depending on the size of the electrode and the conditions of usage, system lifetime and such like, gives acceptable results.

When the additional hydrogen barrier layer according to the invention is provided by means of metallic or metalised tapes, then particularly high quality and reliability results are achieved by the choice of aluminum, copper or tin as the material of the metallic tapes. FIG. 3 illustrates a preferred embodiment of the present invention, whereby the earthing electrode comprises two members which are connected together by nuts and bolts (21) although other conventional means of attachment are also envisaged. The two members (20a, 20b) of the electrode together form a clamping arrangement, whereby the nuts and bolts are used as the means to urge the members together so as to be able to grip the cable (4) in a sandwich type arrangement. Although not shown, the additional hydrogen barrier layer is equally applicable to this configuration of the invention.

FIG. 5 illustrates a metalised heat shrink sleeve which is intended to be inserted over a cable to be protected from hydrogen penetration, in much the same way as the metallic or metalised tapes of the previous embodiment. The purpose of the heat-shrink sleeve is to insulate the electrode from the steel armour wires. The heat shrink sleeve (10) preferably comprises a ribbed (10a, 10b) internal cavity 10c which is metalised, the ribs ensuring that the metallic layer remains intact after heat treatment to shrink the sleeve onto the cable.

It will be appreciated that modifications and variations, as would be readily apparent to the skilled person, may be made to the embodiments described above without departing from the scope of the present invention.

The invention claimed is:

1. An earthing electrode assembly for providing a submerged electrical apparatus with an earth path, the electrode assembly comprising:
   an earthing electrode that connects the submerged electrical apparatus to electrical earth via surrounding water;
   attachment means for attaching the earthing electrode to a cable; and
   an insulated electrical connection for connecting the earthing electrode to the submerged electrical apparatus,
   wherein said insulated electrical connection being of a determined length to enable the earthing electrode to be located at a distance from the submerged electrical apparatus to ensure that the submerged electrical apparatus is protected from electrocheinical effects resulting from operation of the earthing electrode.

2. The earthing electrode assembly according to claim 1, wherein the attachment means releasably attaches the earthing electrode to an outside of the cable.

3. The earthing electrode assembly according to claim 1, wherein the earthing electrode comprises two electrode members which together grip an outer surface of the cable.

4. The earthing electrode assembly according to claim 3, wherein the two electrode members abut one another and provide a central aperture in which the cable is located.

5. The earthing electrode assembly according to claim 3, wherein the two electrode members together form a clamping arrangement, and
   the attachment means urges the two electrode members together to grip the cable.

6. The earthing electrode assembly according to claim 4, wherein the two electrode members abut one another to form a substantially cylindrical outer shape having the central aperture therein.

7. The earthing electrode assembly according to claim 1, wherein said earthing electrode includes a titanium core which is coated with a mixed metal oxide of tantalum and iridium.

8. The earthing electrode assembly according to claim 1, wherein said earthing electrode includes a platinum coating.

9. A cable system comprising:
   a cable connected to an electrical apparatus to be earthed,
   an earthing electrode,
   attachment means for attaching the earthing electrode to the cable, and
   an insulated electrical connection between the earthing electrode and the electrical apparatus to be earthed, the earthing electrode being located at a distance from the electrical apparatus that ensures that the electrical apparatus is protected from electrochemical effects resulting from operation of the earthing electrode.

10. The cable system according to claim 9, wherein the earthing electrode and the attachment means form an electrode assembly capable of being attached to the cable, and
    the electrode assembly is provided with said insulated electrical connection for connecting the earthing electrode to the electrical apparatus when it is submerged,
    wherein said insulated electrical connection being of a determined length to enable the earthing electrode to be located at a distance from the submerged electrical apparatus to ensure that the submerged apparatus is protected from the electrochemical effects.

11. The cable system according to claim 10, wherein the earthing electrode is permanently attached to the cable by being embedded in an outer sheathing of the cable.

12. The cable system according to claim 9, further comprising a hydrogen baffler layer formed of a generally coaxial metallic layer which is located between the earthing electrode and a center of the cable and which extends a predetermined distance on either side of the earthing electrode.

13. The cable system according to claim 12, wherein said hydrogen baffler layer comprises braided metallic or inetallised tapes.

14. The cable system according to claim 12, wherein said hydrogen barrier layer comprises a metallised heat shrink sleeve.

15. The cable system according to claim 9, wherein the insulated electrical connection, between the electrode and the apparatus to be earthed, is formed of a separate insulated conducting lead which runs alongside the cable.

16. A cable system according to claim 9 wherein the cable is an undersea cable which is laid on a sea bed or buried beneath the sea bed.

17. A method of installing an earth electrode assembly having an earthing electrode and an attachment device so that the earthing electrode is capable of attachment to a cable and that the earth electrode assembly is provided with an insulated electrical connection for connecting the earthing electrode to a submerged electrical apparatus, said connection being of a determined length to enable the earthing electrode to be located at a distance from the submerged electrical apparatus to ensure that the submerged electrical apparatus protected from electrochemical effects resulting from operation of the earthing electrode, the method comprising:
   cutting one or more outer layers of the cable, including at least one of a cable sheath and armouring wires,
   displacing the cut one or more outer layers of the cable to expose an inner layer,
   applying a hydrogen barrier layer to said exposed inner layer,
   replacing the cut one or more outer layers of the cable around the hydrogen barrier layer,
   sealing the cable by applying a further cable sheath, and
   attaching the earth electrode to an outside of the cable opposing a position where said hydrogen barrier layer was applied, such that the earth electrode is insulated from all metallic parts of the cable.

18. An electrode assembly, comprising:
   an earthing electrode operative to provide a submerged electrical apparatus with an earth path,
   attachment means for attaching the earthing electrode to a cable, and
   an insulated electrical connection for connecting the earthing electrode to the submerged electrical apparatus,
   wherein the earthing electrode comprises a titanium core which is coated with platinum or a mixed metal oxide of tantalum and iridium.

* * * * *